US010033875B2

(12) United States Patent
Cerullo et al.

(10) Patent No.: US 10,033,875 B2
(45) Date of Patent: Jul. 24, 2018

(54) COMMUNICATION SYSTEM AND METHOD FOR MOBILE DEVICES IN THE ABSENCE OF CELLULAR COVERAGE

(71) Applicant: RAMEL S.R.L., Arezzo (IT)

(72) Inventors: Chiara Cerullo, Arezzo (IT); Cristina Bachechi, Livorno (IT)

(73) Assignee: RAMEL S.R.L., Arezzo (IT)

( * ) Notice: Subject to any disclaimer, the term of this patent is extended or adjusted under 35 U.S.C. 154(b) by 201 days.

(21) Appl. No.: 14/915,060

(22) PCT Filed: Aug. 26, 2014

(86) PCT No.: PCT/IB2014/064064
§ 371 (c)(1),
(2) Date: Feb. 26, 2016

(87) PCT Pub. No.: WO2015/028936
PCT Pub. Date: Mar. 5, 2015

(65) Prior Publication Data
US 2016/0205259 A1    Jul. 14, 2016

(30) Foreign Application Priority Data

Aug. 29, 2013    (IT) .............................. AR2013A0032

(51) Int. Cl.
*H04L 12/46*    (2006.01)
*H04M 7/00*    (2006.01)
(Continued)

(52) U.S. Cl.
CPC ........ *H04M 7/006* (2013.01); *H04L 12/4633* (2013.01); *H04L 65/104* (2013.01);
(Continued)

(58) Field of Classification Search
CPC ... H04L 7/006; H04L 65/104; H04L 65/1046; H04L 65/1069; H04L 65/1096;
(Continued)

(56) References Cited

U.S. PATENT DOCUMENTS 6,904,026 B1 *   6/2005   Tarnanen .............. H04W 8/183
                                                    370/329
9,729,344 B2 *   8/2017   Battig .................. H04L 12/413
(Continued)

FOREIGN PATENT DOCUMENTS

WO        2006067269 A1    6/2006

OTHER PUBLICATIONS

Search report of corresponding Italian application No. IT AR20130032; dated Apr. 30, 2014; 2 pages.

*Primary Examiner* — Afsar M Qureshi
(74) *Attorney, Agent, or Firm* — Brooks Kushman P.C.

(57) ABSTRACT

A communication method for a mobile device of the cellular type is provided. The mobile device is interconnected to a remote server for the management of calls by way of an IP data link (for example through satellite devices). Remote server instructions are received for managing data transmission in the absence of connectivity with the cellular network. A telephone number, relating to a user, is received on a server of the VoIP type which is different from the MSISDN telephone number of the device. The operator of the cellular network is sent a request for Call Forwarding Not Reachable to the telephone number associated with the VoIP user, the incoming calls directed to the telephone number associated with the mobile device. The incoming calls are received on the mobile device in the absence of cellular coverage.

17 Claims, 5 Drawing Sheets

(51) Int. Cl.
    *H04L 29/08*  (2006.01)
    *H04W 8/02*   (2009.01)
    *H04L 29/06*  (2006.01)
    *H04W 76/14*  (2018.01)
    *H04W 84/12*  (2009.01)
    *H04W 88/06*  (2009.01)

(52) U.S. Cl.
    CPC ...... *H04L 65/1046* (2013.01); *H04L 65/1069* (2013.01); *H04L 65/1096* (2013.01); *H04L 67/306* (2013.01); *H04L 69/324* (2013.01); *H04W 8/02* (2013.01); *H04W 76/14* (2018.02); *H04W 84/12* (2013.01); *H04W 88/06* (2013.01)

(58) Field of Classification Search
    CPC . H04L 65/306; H04L 12/4633; H04L 67/306; H04L 69/324; H04W 8/02; H04W 76/023; H04W 84/12; H04W 88/06
    See application file for complete search history.

(56) References Cited

U.S. PATENT DOCUMENTS

| | | | |
|---|---|---|---|
| 2004/0176074 A1 | 9/2004 | Radpour | |
| 2008/0153480 A1* | 6/2008 | Jiang | H04M 7/0057 455/426.1 |
| 2009/0215449 A1* | 8/2009 | Avner | H04W 8/06 455/433 |
| 2012/0273513 A1* | 11/2012 | Stephens | A47K 10/32 221/45 |
| 2012/0302204 A1* | 11/2012 | Gupta | H04M 15/44 455/406 |

\* cited by examiner

COMMUNICATION SYSTEM AND METHOD FOR MOBILE DEVICES IN THE ABSENCE OF CELLULAR COVERAGE

CROSS-REFERENCE TO RELATED APPLICATION

This application is the U.S. national phase of PCT Application No. PCT/IB2014/064064 filed on Aug. 26, 2014, which claims priority to Italian Patent Application No. AR2013A000032 filed on Aug. 29, 2013, the disclosures of which are incorporated in their entirety by reference herein.

The present invention relates to the field of communications and, in particular, it relates to a method, a system and an application for ensuring telephonic connectivity for a mobile phone of the cellular type even in the absence of cellular network coverage.

The development of cellular radio technologies from the 1990s onward has resulted in the creation of many and varied value added services, which have gradually become essential both in daily life and for the success of any commercial activity.

Cellular radio coverage, both GSM or UMTS, in the various different versions used to date, for example under the abbreviations 2G/3G/4G, is uneven, however. Often owing to technical and economic assessments carried out by the various operators, there are areas, some very large indeed, which have no coverage at all; typically areas in which the population density is low or totally absent, such as the oceans, in the desert, in forests or where in any case the economic return for the operators is not such as to justify infrastructural investment.

In the absence of cellular radio coverage, voice and data communications services are typically carried out thanks to alternative infrastructures, wired or satellite, which have wireless connections as needed using Wi-Fi/Wi-Max technology.

For example, on board a ship in mid-ocean the absence of coverage renders cellular phones, such as modern smartphones, useless for making or receiving cellular calls. Usually the users are forced, if they want to contact a user who is on land, to use the terminals on board ship which are made available by the ship owner and which use connections of the satellite type.

Using terminals on board ship has drawbacks. First of all the user cannot access his/her applications and data, for example the contacts directory, which are stored in the memory of the smartphone. Furthermore, terminals on board ship often have a proprietary interface and numbering, which not only make them inconvenient for the user to use but also involve not inconsiderable costs for the ship owner for using the satellite network.

Furthermore, the MSISDN cellular phone number (MSISDN is an acronym for Mobile Subscriber Integrated Services Digital Network-Number) that is associated with the SIM (acronym for Subscriber Identity Module) contained in the smartphone is not reachable and, therefore, the owner of the smartphone cannot receive calls to his/her usual telephone number.

US 2008/0153480 A1 discloses a system for integrating VoIP functionality in mobile infrastructures, in an attempt to contain costs when a mobile phone user is roaming from one area covered by one telephone operator (HPMN) to a second area covered by a second telephone operator (VPMN).

US 2004/0176074 A1 discloses a system that enables calls to be received by users who are on a flight, by way of redirection of the calls made to the user to fixed devices of the aircraft, as an alternative to the user's mobile device, which is deactivated.

WO 2006/067269 A1 discloses a method for routing calls based on the use of VoIP technology.

The systems of the known art therefore still require the presence of mobile network signal coverage or, in its absence, the use of alternative devices to the user's mobile device.

The aim of the present invention is to overcome the above mentioned drawbacks of the known art, by providing a new method that is capable of allowing a user to execute and use voice and data services from his/her own mobile device in all environments where cellular radio coverage is not present.

Within this aim, an object of the present invention is to provide a system that provides a service capable of ensuring the reception of calls directed to an MSISDN number even when this is unreachable.

A further object of the invention is to rationalize and optimize the use of the infrastructures that ensure connectivity in the absence of cellular coverage.

This aim and these and other objects which will become better apparent hereinafter are achieved by a communication method for a mobile device of the cellular type provided with a card with an MSISDN number associated with a user on a cellular network, the method comprising the steps of:

interconnecting the mobile device to a remote server for the management of calls by way of an IP data link, preferably of the satellite type;

receiving a telephone number, communicated by the server and relating to a telephone user, on a server of the VoIP type, said telephone number being uniquely associated with the mobile device and being different from the MSISDN cellular telephone number of the device;

sending, by the mobile device to the operator of the cellular network, a request to divert the incoming calls directed to said MSISDN cellular telephone number to said telephone number associated with said VoIP user. According to a preferred characteristic of the invention, the above mentioned method also comprises the step of receiving, by the mobile device and in the absence of cellular radio coverage, said incoming calls diverted to said associated telephone number.

This aim and these and other objects which will become better apparent hereinafter are also achieved by a communication system comprising:

one or more mobile devices of the cellular type provided with a card of the SIM type which is provided with an MSISDN number and is associated with a cellular network user, said one or more mobile devices being mutually interconnected by way of a local network and being connected to the Internet by way of apparatuses connected to the above mentioned local network;

a remote call server, which is connected to the Internet and is adapted to store, for each one of said one or more mobile devices, a profile that comprises configuration information;

a server of the VoIP type, which is connected to the Internet and to the PSTN network, and is provided, for each one of said mobile devices, with a user for the management of VoIP calls;

a cellular network connected to the PSTN network; wherein the remote server comprises stored:

instructions for the management of the transmission of data in the absence of cellular radio coverage; and a second telephone number related to a user on a server of the VoIP type, said second number being uniquely associated with one of said one or more mobile devices and being different from the cellular MSISDN telephone number provided by the operator of the cellular network; wherein said one or more mobile devices are further adapted to:

detect the absence of connectivity with the cellular network;

receive said instructions and said telephone number from the remote server;

send, to the operator of the telephone network, a request to divert the incoming calls directed to said cellular MSISDN telephone number to said telephone number associated with said. VoIP user;

receive, from the server of the VoIP type, said redirected calls.

The aim and objects of the invention are likewise achieved by a calling application that can be executed on a mobile device that is comprised within the above mentioned communication system, which comprises instructions adapted to:

identify an ISDN number that complies with the ETSI standard supplied by a VoIP server;

setting, by way of signaling with the cellular network, the transfer of the calls directed to said MSISDN number to said number supplied by the VoIP server; and activating the VoIP user associated with said mobile device so that the calls received or generated by said device are managed by said VoIP server.

Advantageously, the method involves the use of existing protocols that are easy to configure and manage and does not require these protocols to be modified.

Conveniently the method according to the present invention makes it possible to execute voice services in a simple and linear manner and at low cost.

Preferably, the system is composed of elements that can be easily integrated and which do not significantly alter the architecture and design of the infrastructure in which they are inserted.

Preferably the system according to the present invention comprises elements that can be configured by way of interfaces that are intuitive and simple to use.

Advantageously the system according to the present invention offers a quality of voice service that is comparable to that of 2G and 3G voice services.

Preferably the application can be executed using devices that can be easily sourced on the market.

Conveniently the application does not interfere with the normal use of the user's device under conditions of normal connectivity i.e. in the presence of cellular coverage.

Preferably, the application has a modular architecture and is scalable.

Further characteristics and advantages of the invention will become better apparent from the detailed description that follows, given by way of a non-limiting example in the accompanying drawings wherein.

Figure 1:
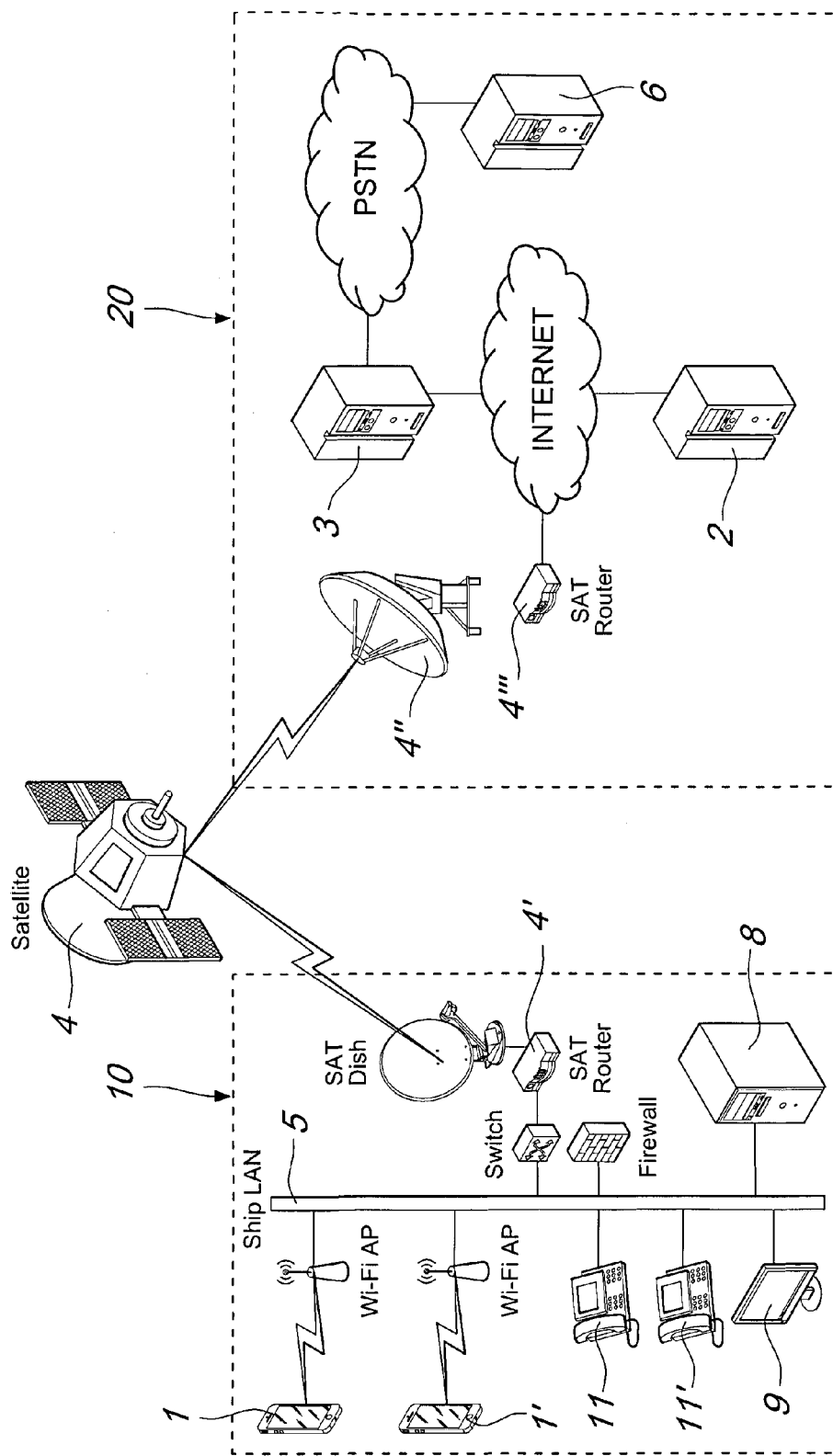
FIG. 1 is a block diagram of the architecture of the system according to the present invention.

An illustrative architecture of the system that is the subject matter of the present invention is summed up in the block diagram in FIG. 1.

FIG. 1 shows a first area 10 that corresponds to a region in which cellular coverage is absent and a second area 20, in which coverage is present, which is connected to the first area 10 by way of a different telecommunications infrastructure than the cellular network. Hereinafter, by way of non-limiting example, it will be assumed that the first area 10 is on board a ship in mid-ocean, the second area 20 is land, and the connection between the two areas is provided for example by orbiting satellites 4, by dedicated apparatuses 4' and by ground stations 4".

In the area 10 are the mobile devices 1, 1' which belong to users on board ship, a local network 5, a local call server 8 and the means 4' for interfacing to the network 4, preferably satellite, that enables IP connectivity.

The mobile devices 1, 1' are conventional and are provided with at least one SIM or USIM card with an associated MSISDN telephone number for access to cellular mobile telephony services.

On board ship, owing to absence of coverage, such number is not reachable and cannot be used for making or receiving telephone calls. The mobile devices 1, 1' are furthermore provided with radio interfaces that support commonly-used wireless communication protocols, such as Wi-Fi. In the preferred embodiment the mobile devices 1, 1' comprise smartphones that are provided with Android, iOS, BlackBerry OS or Windows Mobile OS operating systems and with means that enable the execution of software applications specifically designed for mobile devices and which are commonly defined "mobile apps" or simply "apps". In particular the mobile devices can execute a calling application 30 which will be described below. The devices 1, 1' can, by way of the Wi-Fi interfaces, connect to the local network 5.

The local network 5 is an on-board network and is organized according to the most adapted topologies that take account of the architectural requirements of the ship on which it is arranged. The local network 5 comprises at least access points of the Wi-Fi type for the interconnection of mobile devices 1, 1', a switch connected to a router 4' which is in turn connected to the satellite network 4 and a firewall that contains rules for controlling access to the satellite network 4 by mobile devices 1, 1' and for monitoring the flow of data passing through the local network 5.

The satellite network 4 is conventional and provides access to the Internet through one or more geostationary satellites 4.

In the preferred embodiment the area 10 is connected to the satellite network 4 by way of a satellite router 4' provided with an antenna of the dish type; the area 20 has teleport units or ground stations 4" that act as hubs for connection between the satellite network 4 and satellite routers 4''' that are connected to the Internet.

The local call server 8 is connected to the network 5 and makes it possible to integrate the mobile devices 1, 1' into the IP-PBX system of the area 10, so that such devices 1, 1' can communicate with each other without accessing the satellite network 4. The local server 8 has a list of owners of devices 1, 1' that are enabled, according to criteria set for example by the operator of the network 5, to make local calls, i.e. calls to other users on the ship. The local server 8 makes such list available to these users so as to enable them to make contact with each other. The local server 8 is configurable by way of a control unit that is connected to the network 5.

The local server 8 and the control unit are optional.

The area 20 comprises, in addition to the means 4" and 4'" for the connection to the satellite network and to the Internet, a remote server 2 for the management of calls, a server 3 of the VoIP type, VoIP being an acronym for Voice over IP, which is connected, by way of the PSTN network, PSTN being an acronym for Public Switched Telephone Network, to the cellular network 6.

The remote server 2 for the management of calls is connected to the Internet and comprises at least means for the storage of information. In particular, the remote server 2 has an adapted area that can be reached by Internet without any identification process, by way of which the devices 1, 1' can obtain binary code that, when conveniently installed, generates the calling application 30. The remote server 2 is adapted to provide a version of the calling application 30 which is compatible with the characteristics of the operating system of the device 1, 1'. For example if the remote server 2 identifies the mobile device 1, 1' as an iPhone, it will supply a version of the calling application 30 which is compatible with the version of the iOS operating system installed on this iPhone. The remote server 2 further comprises means for the management, control and monitoring of the calling application 30, of the mobile device 1, 1'.

The remote server 2 comprises, for each one of the owner-users of the device 1, 1', a user profile, which is stored in a database. Such profile, which is accessible remotely, comprises the configuration data used by the application 30 and a unique activation number, generated by the calling application 30, which is uniquely associated with the calling application 30 and with the device 1, 1' on which it is installed. The activation number makes it possible for the remote server 2 to quickly identify the device on which the application 30 is installed. The profile can contain additional information such as billing data.

The remote server 2 is configurable by way of a "web-consumer" interface and an "operator" interface.

The web-consumer interface is accessible by way of authentication and allows operations to control and enter data.

The operator interface enables the operator to check the status of the application 30, by consulting the log files generated by such application 30, and to deactivate it.

From the architectural point of view, the remote server 2 is scalable and is capable of storing an increasingly large amount of data. In the preferred embodiment the server 2 uses RAID disks that are capable of storing the data in the event of malfunction and which ensure a maximum out-of-service time of 10 seconds/month.

The server 3 of the VoIP type is conventional and makes it possible to have a telephone conversation by using an Internet connection or any other packet-switched network that uses the IP protocol. In other words, the VoIP server provides a service that makes it possible to make calls using an adapted application software that is commonly known as a "softphone". This application has a graphical interface for making telephone calls via the Internet. The calling application 30 provides a softphone by way of the module 24, which will be described below.

Furthermore the server 3 of the VoIP type provides a number, hereinafter "VoIP number", which conforms to the ETSI standards. This number is saved in the user profile of the device 1, 1' stored in the remote server 2, and is made available to the application 30. Using methods that will become better apparent below, telephone calls destined for the user's MSISDN number are redirected to such number in the absence of coverage.

The network 6 is conventional and comprises a mobile phone telecommunications network that serves multiple users provided with SIMs. The operator of the network 6 provides a "Call Forwarding Not Reachable" service that, if the MSISDN number of the customer cannot be reached owing to being out of coverage, redirects the call to another number that belongs to the ETSI fixed or mobile network numbering scheme, as long as the forwarded-to number has the same international prefix as the SIM or USIM of origin.

The network 6 furthermore offers a service for selectively activating and deactivating the above mentioned Call Forwarding Not Reachable, by way of sending messages based on the USSD protocol, USSD being an acronym for Unstructured Supplementary Service Data. In the preferred embodiment these messages are generated by the calling application 30 on the basis of the configuration data supplied by the remote server 2.

Figure 2:
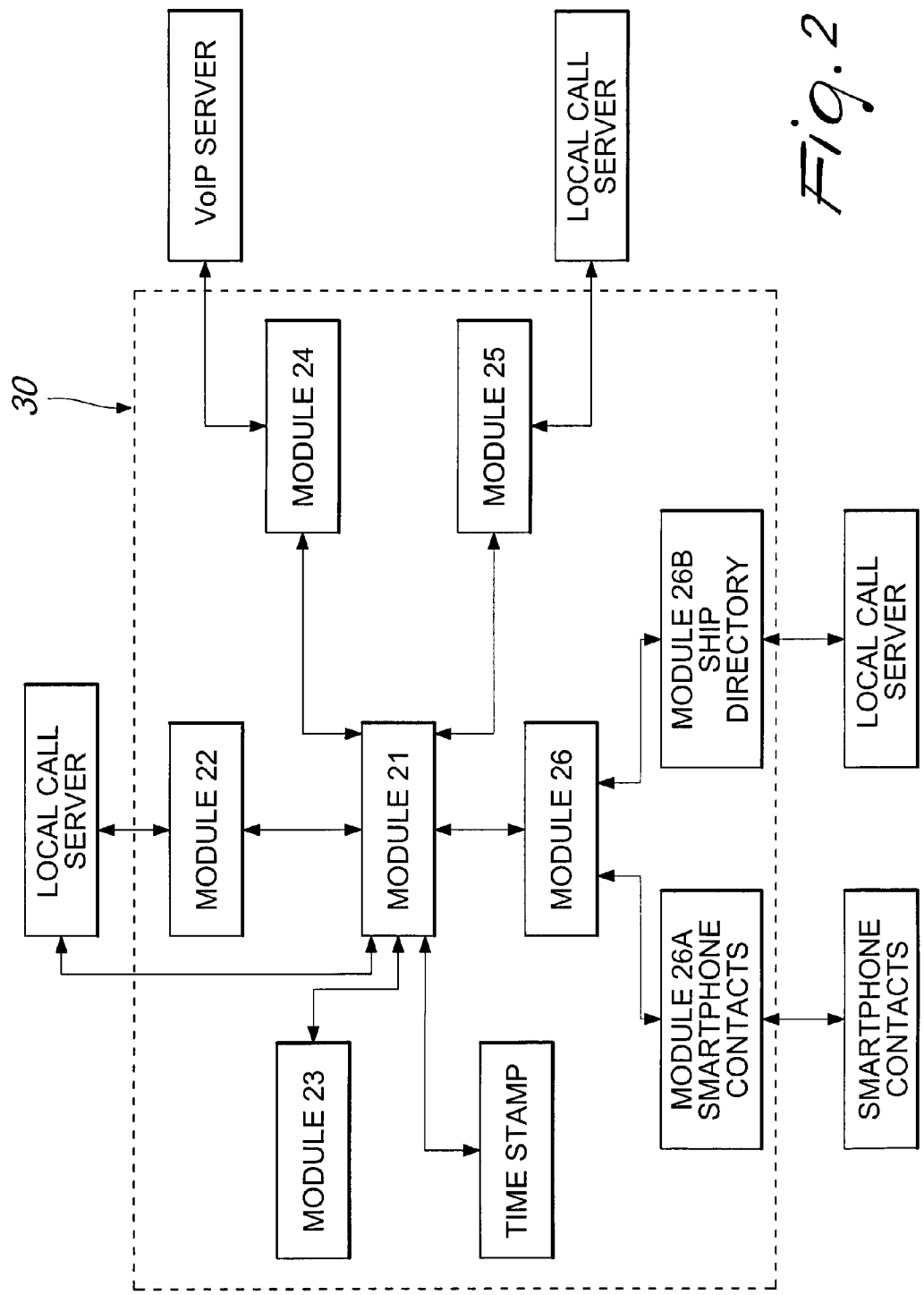
FIG. 2 is a block diagram of the application according to the present invention.

With reference to the flowchart in FIG. 2, a block diagram shows the application software 30 according to the present invention. The calling application 30 is preferably obtained by way of downloading from the remote server 2 and is activated when the signal of the cellular network 6 is absent in such a way that the owner of the device 1, 1' can contact or be contacted telephonically by a user who is on land or another owner of a device 1, 1'.

The calling application 30 is adapted to communicate with the remote server 2 without using an MMI interface, and has access to some of the data contained in the user profile associated with the owner of the device 1, 1', including the telephone number on which to activate Call Forwarding Not Reachable, the time of validity, the configuration data for the services of the VoIP type and the configuration data for interfacing with the local call server 8. Furthermore the calling application 30 generates and provides to the remote server 2 a code, called "activation number", which is used to identify the calling application 30 and the device 1, 1' on which it is installed.

The calling application 30 is organized into modules that can access, on the basis of determined permissions, the content of adapted areas of memory of the device, called registers, in order to read the contents thereof or in order to write a new data item thereto. The values of these registers are set on the basis of values obtained from the remote server 2 or generated by the application itself.

In a preferred embodiment there are registers A-I.

The A register comprises information relating to the status of the connection to the telephone network 6 and to the local network 5 and information relating to the response of the telephone network to the Call Forwarding Not Reachable request, sent in the form of a USSD message, to redirect the call. The B register comprises information relating to the VoIP user associated with the device. The C register comprises information relating to the connection of the mobile device 1, 1' with the server 8 for local calls. The D register comprises information relating to the telephone number, supplied by the VoIP server and stored in the user profile, to which to forward the calls. The E register comprises the activation number associated with the mobile device 1, 1'. The F register comprises time-related information that is generated by the mobile device 1, 1' and is used in order to establish the validity of the application 30. The G register comprises log information relating to the calls made by the devices 1, 1'. The H register comprises information relating to the history of the calls made by the device 1, 1'. The I register comprises information relating to the original telephone number for Call Forwarding Not Reachable.

In the preferred embodiment, the calling application 30 comprises the following modules.

The module 21 is in connection with all the other modules of the calling application 30 and is adapted to obtain status information from them and communicate it to the remote server 2. Furthermore it is adapted, in the event of incongruities arising or if the operation time period assigned to the application by the remote server 2 expires, to place the calling application into a state that does not allow it to make calls. Furthermore the module 21 is capable of accessing time-related information provided by the mobile device.

The module 22 allows the sending of registration information to the remote server 2. Registration is the necessary step in order to be able to use the call services in the event of absence of a mobile phone signal. If incorrect user data is entered or if there is a data transmission error, the module 22 receives an error message from the remote server 2. The module 22 comprises means adapted to obtain, from the remote server 2, the VoIP telephone number for Call Forwarding Not Reachable. This number is saved in the D register.

The module 23 is connected to the module 21 and is adapted to activate and deactivate Call Forwarding Not Reachable for the SIM of the device 1, 1' that is in the area 10.

The module 23 is adapted to send messages, of the USSD type, to the cellular network 6. In the event of the presence of a mobile radio phone signal (therefore the telephone number of the SIM is reachable), the module 23 prepares and sends a USSD message in order to obtain information on the initial setting state of Call Forwarding Not Reachable. The result of such action is receiving a reply message of the USSD type from the cellular network which usually comprises an ISDN number, for example of an apparatus on the fixed network or of another mobile device, which was originally set by the user and to which the calls are redirected. This number is conveniently saved, preferably in the I register.

The module 23 obtains, from the D register, the telephone number written by the module 22 and prepares a message of the USSD type that contains it. In the preferred embodiment, this message is immediately sent after obtaining the VoIP number used for Call Forwarding Not Reachable. At this point the VoIP profile associated with the owner of the device 1, 1' can be activated, according to the methods indicated by the module 24 and 25, and used in order to allow the owner of the device 1, 1' to be reached.

The module 23 is moreover adapted to restore the mobile device 1, 1' to the conditions in which it was before the absence of coverage arose. The restoration operations comprise the generation of USSD messages for the deactivation of Call Forwarding Not Reachable on the VoIP number, stored in the D register, and the reactivation of Call Forwarding Not Reachable on the ISDN number, different from the VoIP number, previously saved in the I register.

Preferably the module 23 is adapted to store, preferably in the A register, the replies given by the network 6 to the sending of USSD messages. Finally the module 23 is adapted to record, preferably in the F register, the log messages accompanied by timestamps of its activities.

The module 24 comprises means adapted to make calls of the VoIP type, preferably according to the H323 and SIP protocol and in any case according to a protocol that makes it possible to use all the services offered by the server 3 of the VoIP type. The module 24 thus acts as a softphone for the server 3 VoIP and manages the procedure of registration/ affiliation with such server 3. Preferably the procedure of registering with the VoIP server has to be comprised of a maximum of 10 attempts, which obviously may be interrupted in the event of success, separated by randomized time intervals. Once the registration on the server 3 has been completed, the module 24 keeps the connection to the VoIP server 3 active until the data connection is lost or the user carries out a forced stop.

The module 24 has access to the contacts of the mobile device 1, 1'. Preferably the module 24 has access to the information contained in the A and B registers.

The module 25 comprises means adapted to make calls of the VoIP type, preferably according to the H323 and SIP protocol and in any case according to a protocol that makes it possible to use all the services offered by the local call server 8. The module 25 thus acts as a softphone for the local call server 8 which manages the calls received and destined for users who are registered on this server. Preferably the module 25 has access to the data of the A and C registers.

The module 26 makes available the telephone numbers stored on the device 1, 1' and also the "on board" telephone number directory provided by the local server 8 so that they can be used by the owner of the device 1, 1' in order to make calls or in order to identify the caller. Preferably the contacts lists are organized in sub-modules 26A and 26B.

The calling application 30 is furthermore provided with a graphical interface that is organized into tabs and makes it possible to access lists of contacts, to make and receive calls and to change the settings. For example the owner of the device 1, 1' can increase or decrease the audio quality of the calls and with consequent greater or lesser use of the necessary network resources.

Figure 3:
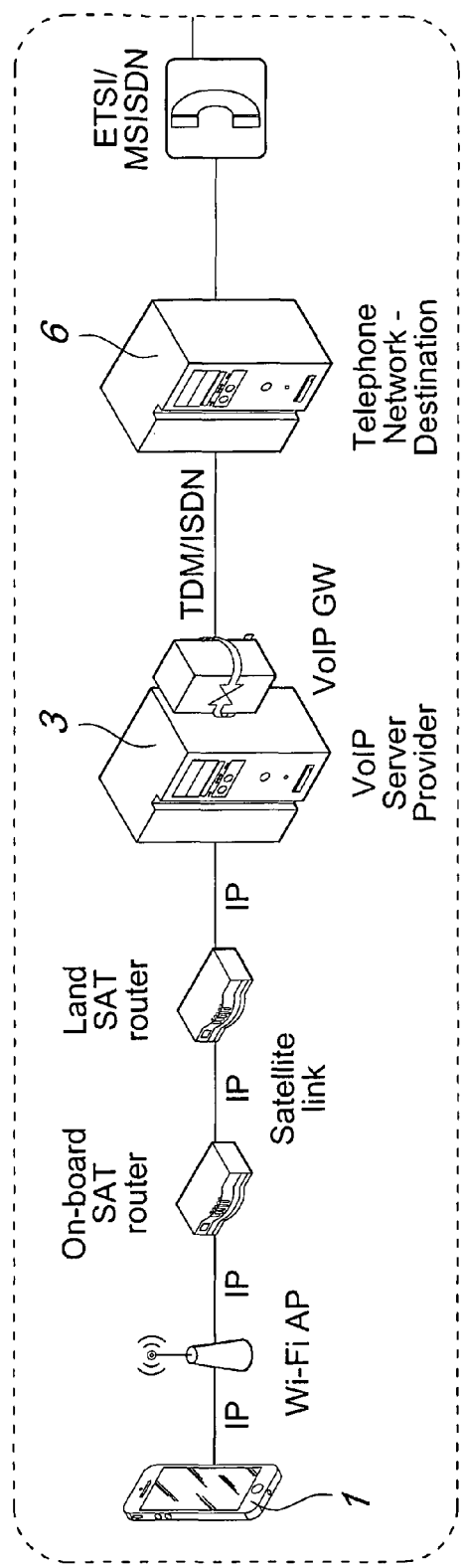
FIG. 3 is a block diagram that shows an aspect of the system in FIG. 1 in greater detail.
Figure 4:
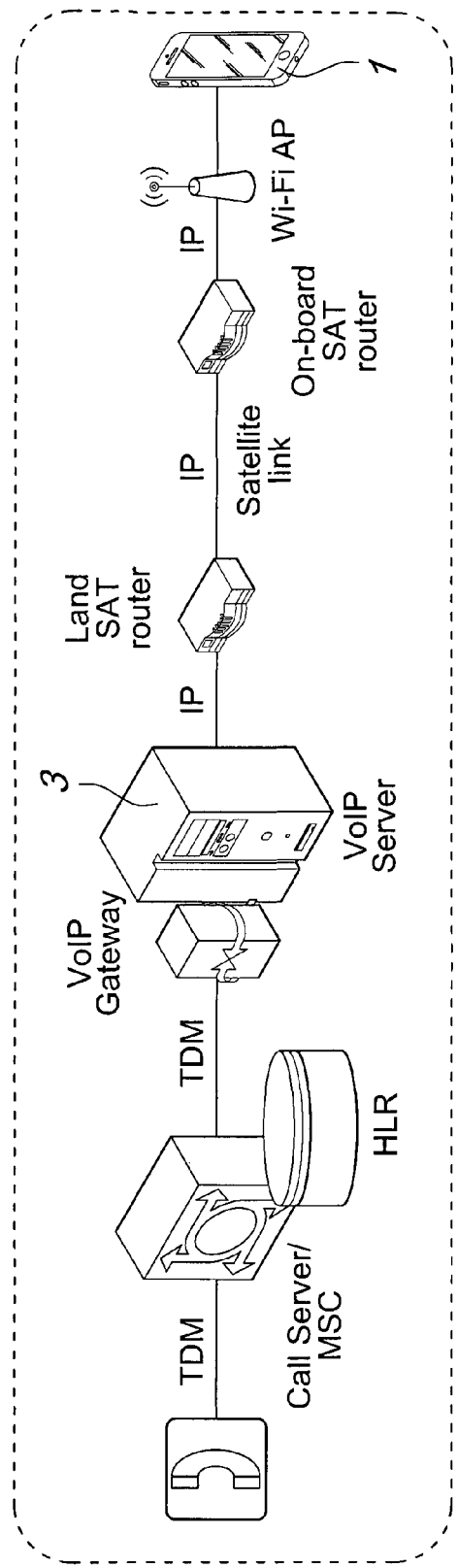
FIG. 4 is a block diagram that shows a second aspect of the system in FIG. 1 in greater detail.
Figure 5:
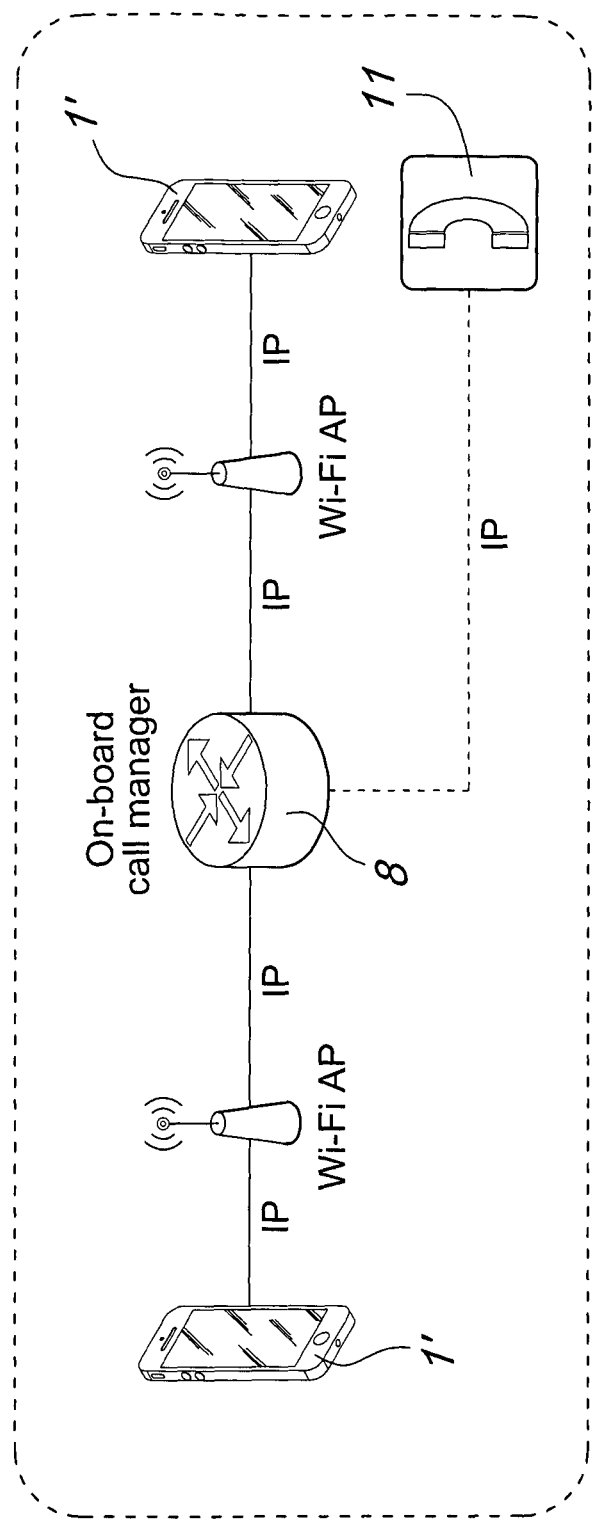
FIG. 5 is a block diagram that shows a third aspect of the system in FIG. 1 in greater detail.

FIGS. 3, 4 and 5 show various different call scenarios that involve owners of the device 1, 1' (referred to as onboard users, operating in areas outside cellular radio coverage) and users who are on land where the cellular radio coverage is present.

Merely for the purposes of clarity of description, FIGS. 3, 4 and 5 do not show some of the elements that make up the system in FIG. 1; however, it is assumed that these elements are present. Furthermore it is assumed that the device 1, 1' has already obtained, installed and configured the calling application 30.

With reference to FIG. 3, a block diagram shows the operation of the system in FIG. 1 in the event of a call made by the device 1, 1' and destined for a user on land.

The on-board user who owns the device 1, 1' types the ISDN telephone number of the land user into the interface provided by the application 30. The number can also be obtained from the "Phone contacts" made available by the module 26A. The calling application 30, entirely transparently to the owner of the device 1, 1', activates the VoIP profile of the calls on the VoIP server 3 by way of adapted signaling. In the preferred embodiment the signaling complies with the SIP protocol. The application 30 acts as a softphone for the VoIP server 3. The VoIP server 3 selects the nearest VoIP gateway to the called party and routes the call through this gateway. The called party does not see the "CALLER ID" of the caller but instead the ISDN number associated with the gateway. In the preferred embodiment, such CALLER ID is masked and the called party sees a wording of the "Private Number" type.

The signaling procedure and the operations performed by the gateway are entirely transparent to the calling user.

With reference to FIG. 4, a block diagram shows the operation of the system in FIG. 1 in the event of a call generated by a user (caller) on land and destined for the user who owns the device 1, 1' (the called party) who is in a region outside the coverage of the mobile phone network. The caller makes the call to the MSISDN number associated with the SIM card that is in the device 1, 1' but which is however not reachable. The calling application 30 activates the profile of the user, on the basis of the information obtained from the remote server 2. In particular, the calling application obtains a VoIP number that preferably has a prefix that belongs to the country where the SIM was issued. Furthermore, the application 30 activates, by way of adapted signaling, preferably USSD, Call Forwarding Not Unreachable on the network 6, so that the calls will be redirected to the number supplied by the VoIP server. The VoIP server 3, having received the call from the telephone network, can then in turn route the call to the owner of the device 1, 1'. In this manner, on the one hand it is possible to receive incoming calls to the owner which are destined to his/her MSISDN number of 2G/3G/4G type associated with the SIM card. If requested or when appropriate, for example owing to the restored presence of coverage, the application 30 deactivates the Call Forwarding Not Reachable setting that was previously set on the VoIP number.

With reference to FIG. 5, a call is shown that involves two on-board users (both operating out of cellular radio coverage) who are connected to the local server 8. Each user accesses the On-board Directory which contains information for contacting various on-board users, i.e. an internal number associated with them, their status (Active/Inactive), and their location. Preferably, the directory is updated in real time and also comprises the fixed user devices on board ship i.e. the telephone numbers of the fixed apparatuses 11, 11' that are connected to the network 5. The calling application 30 enables the on-board user to make "On-board Calls" using the numbers present in the "On-board Directory", by selecting such user from a graphical menu or by manually typing the number of the desired on-board user. The mechanisms for signaling the call, which is of the VoIP type, are handled by the local server 8 which can be configured via a computer station 9 connected to the local network 5. The calls are made without accessing the satellite transmission system 4.

It is obvious that the call thus set up is of the PtP type, PtP being an acronym for Point to Point, and can occur not only between owner-users of mobile devices 1, 1' but also between these users and the fixed terminals 11, 11' that are connected to the network 5.

In practice it has been found that the method and the system described fully achieve the intended aim and objects. In particular, it has been seen that the system thus conceived makes it possible to overcome the qualitative drawbacks of the known art through the "portability" of the telephone calls to VoIP, i.e. by routing, entirely automatically and transparently to the user, calls destined for the MSISDN number associated with the SIM operating in areas in which the mobile telecommunications network radio coverage is absent to a VoIP number. The object is achieved, among other things, by way of the combination of the Call Forwarding Not Reachable service supplied by the cellular network 6 and by the making available of an ETSI telephone number by a VoIP server 3. The invention thus conceived achieves the object of providing the occupants of a ship/aircraft in transit with the voice and data services that are available on land, directly from their mobile device. Thanks to the present invention the owner of the mobile device accesses the voice and data services in a simple manner that does not require complicated operations or operations that in any case are different from those normally carried out in areas of coverage for access to the above mentioned services.

Moreover, the present invention makes possible, by way of mechanisms for managing and controlling the modes of access to the satellite resource, a more rational use of this resource with consequent lowering of costs.

Clearly, numerous modifications are evident and can be readily executed by the person skilled in the art without extending beyond the scope of protection of the present invention.

For example, it is obvious for the person skilled in the art that although the present invention has been presented in relation to a maritime environment such as the interior of a yacht, mercantile ships, and cruise ships, where the costs of managing the satellite connection are sensitive for the ship owner, it can be used in any context in which the availability of 2G/3G/4G networks is typically absent.

Hence, the scope of protection of the claims shall not be limited by the explanations or by the preferred embodiments illustrated in the description by way of examples, but rather the claims shall comprise all the patentable characteristics of novelty that reside in the present invention, including all the characteristics that would be considered as equivalent by the person skilled in the art.

The invention claimed is:

1. A communication method for a mobile device of the cellular type provided with a card with an MSISDN number associated with a user on a cellular network, the method comprising the steps of:
- interconnecting the mobile device to a remote server for the management of calls by way of an IP data link, the remote server for the management of calls being arranged in an area in which cellular coverage is present and the mobile device being arranged in an area in which cellular coverage is absent;
- receiving a telephone number, communicated by the server and relating to a telephone user, on a server of the VoIP type, the telephone number being uniquely associated with the mobile device and being different from the MSISDN cellular telephone number of the device;
- sending, by the mobile device to the operator of the cellular network arranged the area in which the cellular coverage is present, a request to divert the incoming calls directed to the MSISDN cellular telephone number to the telephone number associated with the VoIP user; and
- receiving, by the mobile device arranged in the area in which the cellular coverage is absent, the incoming calls diverted to the associated telephone number.

2. The method according to claim 1, further comprising the steps of:
- making a call to a telephone number of a user of the cellular network;
- hiding the cellular telephone number of the mobile device from which the call originates; and
- forwarding, by way of the VoIP server, the calls to the user.

3. The method according to claim 1, comprising the steps of:
- connecting the mobile device to a local server for the management of calls;
- obtaining, by the local server for the management of calls, the list of all the mobile devices that are connected to the local server;

making a telephone call to a second mobile device connected to the local server; and
establishing, by way of the local server, a point-to-point connection between the first device and the second device and encapsulating the data of the call in the connection.

4. The method according to claim 1, wherein the call divert request comprises a message of the USSR type that comprises the VoIP number, the number being stored in the remote server in a user profile associated with the device and made available to the mobile device.

5. The method according to claim 1, further comprising the steps of:
generating a numeric identification code on the basis of time-related information associated with an instant when instructions for the management of data transmission in the absence of connectivity with the cellular network are communicated by the server and of a unique identifier associated with the mobile device, such as the IMEI.

6. The method according to claim 5, wherein the instructions comprise binary files adapted to be installed and executed on the mobile devices.

7. The method according to claim 1, wherein the request to divert is of the "Call Forwarding Not Reachable" type.

8. A communication system comprising:
one or more mobile devices of the cellular type provided with a card of the SIM type which is provided with an MSISDN number and is associated with a cellular network user arranged in an area in which cellular coverage is present, the one or more mobile devices being arranged in an area in which cellular coverage is absent and being mutually interconnected by way of a local network and being connected to the Internet by way of apparatuses connected to the local network;
a remote call server arranged in the area in which the cellular coverage is present, which is connected to the Internet and is adapted to store, for each one of the one or more mobile devices, a profile that comprises configuration information;
a server of the VoIP type, which is connected to the Internet and to the PSTN network, and is provided, for each one of the mobile devices, with a user for the management of VoIP calls;
a cellular network connected to the PSTN network;
the remote server comprising stored:
instructions for the management of the transmission of data in the absence of cellular radio coverage; and
a second telephone number related to a user on a server of the VoIP type, the second number being uniquely associated with one of the one or more mobile devices and being different from the cellular MSISDN telephone number provided by the operator of the cellular network;
the one or more mobile devices being further adapted to:
detect the absence of connectivity with the cellular network;
receive the instructions and the telephone number from the remote server;
send, to the operator of the telephone network, a request to divert the incoming calls directed to the cellular MSISDN telephone number to the telephone number associated with the VoIP user; and
receive, from the server of the VoIP type, the redirected calls.

9. The system according to claim 8, wherein:
at least one of the one or more mobile devices is adapted to make a call to a telephone number of a second user of the cellular network; and
the VoIP server is further adapted to hide the cellular telephone number of the at least one of the one or more mobile devices from which the call originates and to forward, by way of the VoIP server, the calls to the second user.

10. The system according to claim 9, comprising a local server for the management of calls, which is connected by way of a connection of the Wi-Fi type to the one or more mobile devices and the one or more mobile devices being further adapted to
obtain, from the local server for the management of calls, the list of mobile devices that are connected to the local server;
make a telephone call to a second mobile device that is connected to the local server; and
establish a point-to-point connection between the first device and the second device and encapsulate the data of the call in the connection.

11. The system according to claim 8, wherein the request to divert is of the "Call Forwarding Not Reachable" type.

12. A calling application that can be executed on a mobile device that is comprised within the system according to claim 8, which comprises instructions adapted to:
identify an ISDN number that complies with the ETSI standard supplied by a VoIP server;
setting, by way of signaling with the cellular network, the transfer of the calls directed to the MSISDN number to the number supplied by the VOIP server; and
activating the VoIP user associated with the mobile device so that the calls received or generated by the device are managed by the VoIP server.

13. A communication method comprising:
connecting a mobile cellular device, located in a first area in which cellular coverage is absent, to a remote server for the management of calls, located in a second area in which cellular coverage is present, by way of an IP data link, the mobile cellular device having a SIM card with an MSISDN number associated with a telephone user on a cellular network;
sending, from the mobile device to an operator of the cellular network located in the second area in which the cellular coverage is present, a request to divert the incoming calls directed to the MSISDN number to a VOIP telephone number on a VoIP server, the VoIP telephone number being uniquely associated with the mobile cellular device and being different from the MSISDN number of the mobile cellular device, the VoIP telephone number being communicated by the remote server and relating to the telephone user associated with the VoIP server; and
receiving, at the mobile device located in the first area in which the cellular coverage is absent, the incoming calls diverted to the VoIP telephone number.

14. The method of claim 13, wherein the request to divert incoming calls includes a USSD message including the VOIP telephone number, the VoIP telephone number being stored in the remote server in a user profile associated with the mobile cellular device and made available to the mobile cellular device.

15. The method of claim 13, wherein the request to divert incoming calls is of the "Call Forwarding Not Reachable" type.

16. The method of claim 13, further comprising:
identifying an ISDN number that complies with the ETSI standard supplied by the VoIP server;
setting, by way of signaling with the cellular network, the transfer of the calls directed to the MSISDN number to the VoIP telephone number supplied by the VoIP server; and
activating a VoIP user associated with the mobile device so that the calls received or generated by the device are managed by the VoIP server.

17. The method of claim 13, further comprising:
generating a numeric identification code on the basis of time-related information associated with an instant when instructions for the management of data transmission in the absence of connectivity with the cellular network are communicated by the remote server.

* * * * *